Patented Dec. 19, 1933

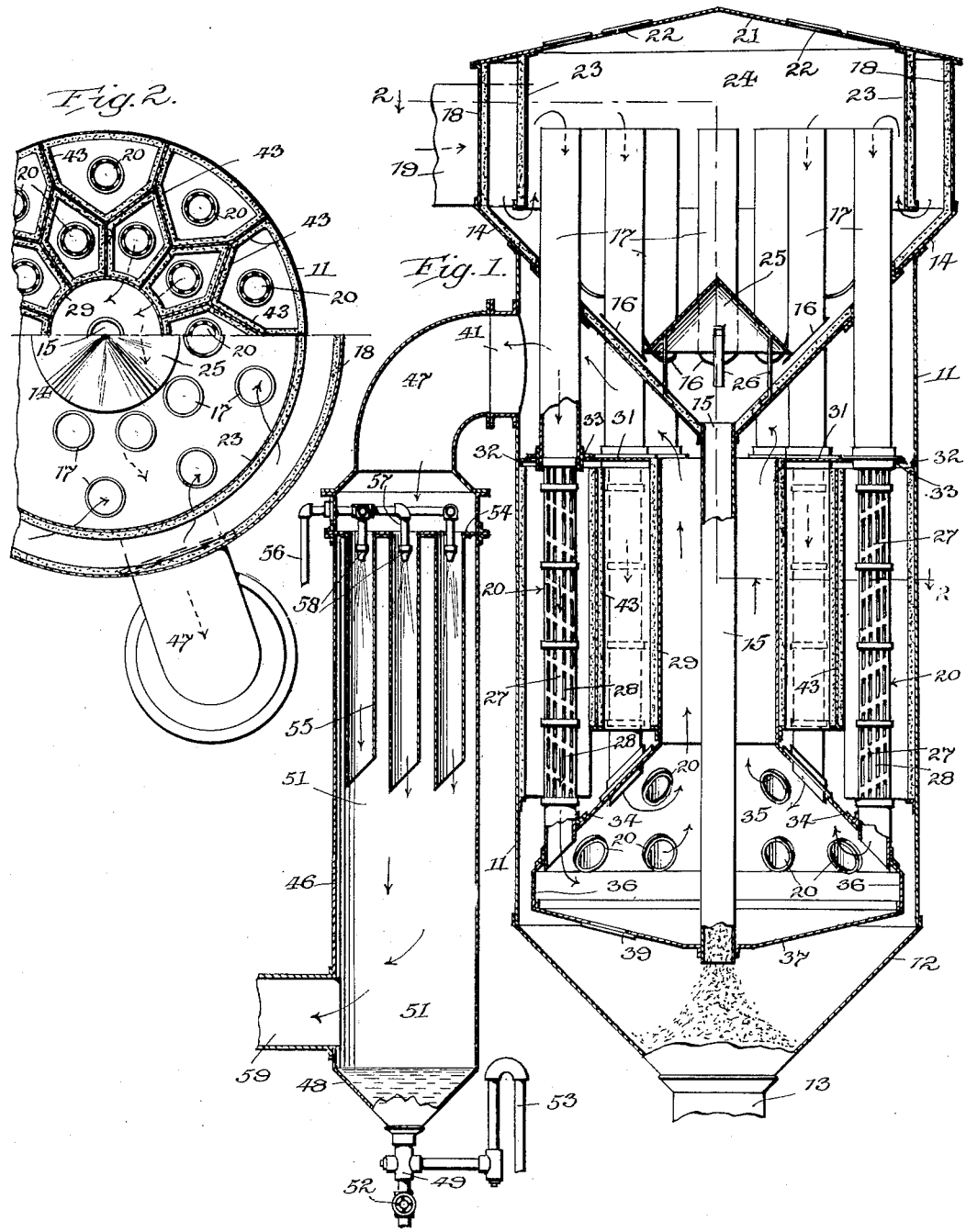

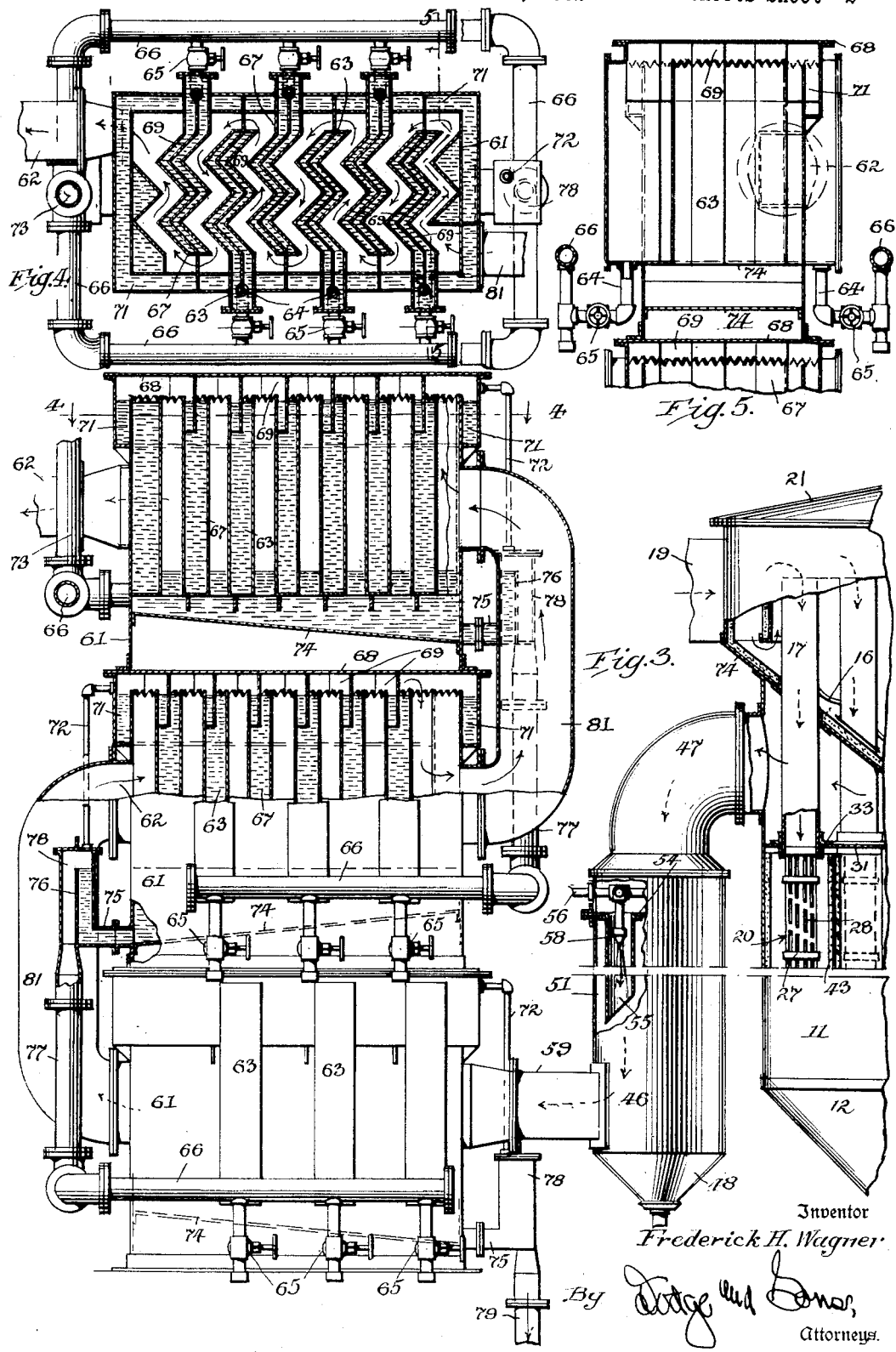

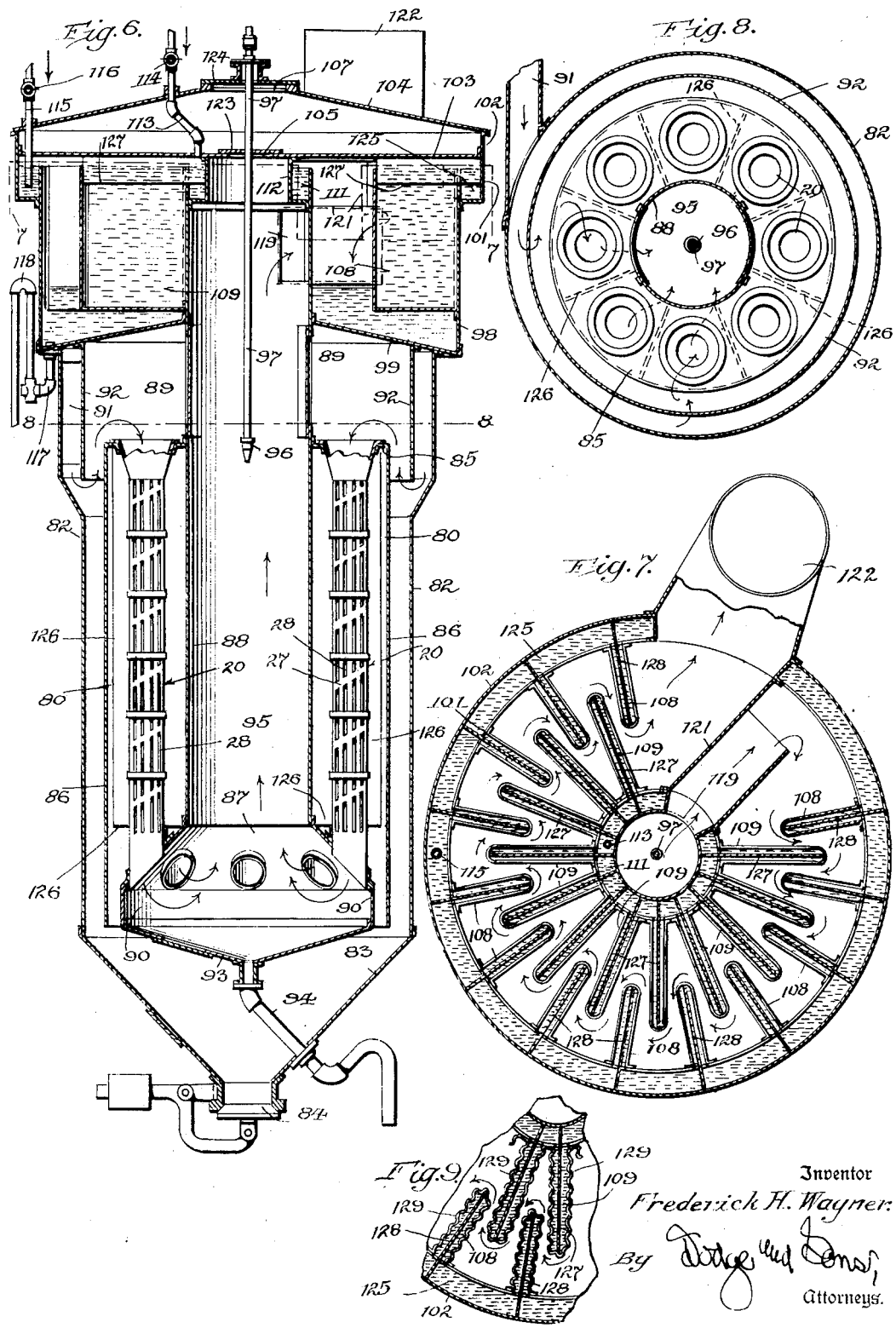

1,940,199

UNITED STATES PATENT OFFICE 1,940,199

DUST EXTRACTOR

Frederick H. Wagner, Baltimore, Md.

Application January 27, 1932. Serial No. 589,254

11 Claims. (Cl. 183—23)

This invention relates to dust extractors, and particularly to extractors of the combination wet and dry type.

In apparatus of the prior art, the extraction of dust has been difficult and has been fraught with many disadvantages, both because of the expense of installation and because of the exact regulation required to obtain uniform results. Extensive experimentation has demonstrated the fact that a very high percentage of the dust may be removed from gases by a preliminary centrifugal extraction of the larger particles, and then a further extraction making use of the phenomena of nature to cause condensation of water vapor about dust particles in the gas as nuclei.

A system operating in this manner is disclosed and claimed broadly in my copending application, Ser. No. 548,209, filed July 1st, 1931. The present invention constitutes a further development of this idea and one in which the gas containing fine particles of dust is saturated with water vapor, preferably electrically charged, and thoroughly agitated and passed through irregular pasageways, where it is brought into contact with water films. In this way, the temperature of the gas is lowered uniformly throughout to cause condensation of the water vapor about the dust particles, and the water containing the dust flows away while the gas passes on cooled and substantially free from dust.

The use of separators of this character is particularly effective in the treatment of gases containing fumes or metallic vapors which cannot be separated by ordinary apparatus. Apparatus embodying this invention is particularly economical in operation, because the energy present in the gas in the form of heat is utilized to the fullest extent, thus avoiding the necessity of supplying energy to the gas in carrying out the extraction process.

Broadly stated, the invention comprises the combination with a dry centrifugal extractor unit, of a saturation unit in which partially cleaned gas is subjected to electrical effects and saturated with water vapor, and a cooling and condensing unit so combined with the other parts of the apparatus as to agitate the gas thoroughly, condense the water vapor in it, and deliver the gas at a lowered temperature to the point where it is to be stored or used.

The objects and advantages of apparatus embodying this invention will appear from the following description, when read in connection with the accompanying drawings, in which,—

Fig. 1 is a vertical sectional view through one form of preliminary extracting means embodying this invention, this means being shown in connection with the saturation device;

Fig. 2 is a partial section on line 2—2 of Fig. 1, showing certain details of the extractor construction;

Fig. 3 is a view similar to Fig. 1 with the extractor broken away and a cooling and condensing unit added, certain parts of this unit being shown in section and others in elevation;

Fig. 4 is a section of one of the condenser units taken on line 4—4 of Fig. 3;

Fig. 5 is a partial section on line 5—5 of Fig. 4;

Fig. 6 is a vertical sectional view of a unitary dust extracting device in which the preliminary extractor, saturating device, and condenser unit are combined in one unitary structure;

Fig. 7 is a horizontal sectional view on line 7—7 of Fig. 6;

Fig. 8 is a section on line 8—8 of Fig. 6; and

Fig. 9 is a sectional detail of a modified form of water box suitable for use in the apparatus of Fig. 6.

Referring to Fig. 1 of the drawings, the reference character 11 designates the vertical shell of the preliminary extractor, this shell terminating at the bottom in a hopper 12 and an outflow tube 13. This shell is preferably constructed of a material which is capable of withstanding high temperatures without deterioration, because gases to be treated are preferably supplied to the extractor directly from a high temperature source, such as a furnace. Extending downwardly inside of shell 11 and near the top of the shell is an inverted cone-shaped wall 14, having its apex connected with the inside of hopper 12 through a tube 15. The wall 14 contains spaced perforations 16 to receive the upper ends of extractor tubes 17.

Extending upwardly from the top of wall 14 is an annular wall 18 having a tangential gas inlet tube connected with it at 19. Wall 18 is closed at the top by a cover 21 containing suitable manholes 22 and carrying a depending annular skirt 23, in spaced relation to wall 18 and terminating a substantial distance below the top ends of tubes 17. This skirt completes the formation of a chamber 24 inside of wall 18, and renders the passageway connecting the inlet tube 19 with the tubes 17 irregular, thus subjecting the dust in the entering gas to an additional separating effect before it enters the extractor tubes.

Dust particles which are separated from the gas by this preliminary effect, slide down the inclined wall 14 and fall through tube 15 to hopper 12. Passage of gas from the chamber 24 above the tubes 17 through tube 15 is retarded by a conical deflector 25, mounted above the inlet end of tube 15 and supported in spaced relation to the tube entrance by legs 26, only sufficient space being provided for passage of dust between this deflector and wall 14. The top ends of tubes 17 leading to the centrifugal extractor devices, project through the openings 16 in wall 14 into the chamber 24 above the lower end of skirt 23.

Each of the tubes 17 is in direct communication with a centrifugal extractor device connected with it at the bottom. These devices, designated 20, are made up of tubular sections 27 containing helical baffles which give the gas a whirling motion as it passes downwardly. The walls of the sections 27 contain vertical openings 28 through which dust is thrown by centrifugal action, so as to fall into hopper 12 at the bottom of the extractor shell. Each extractor is made up of a plurality of these sections held together in end-to-end relation in any suitable manner, and forming a continuation of the tubes 17. These tubes are described and claimed in my copending application, Serial No. 548,208, filed July 1st, 1931, to which reference may be had for the details of construction.

Practical experience has demonstrated the fact that large volumes of gas may be freed from dust by separating the gas volume into a plurality of small streams, each of which is subjected to independent centrifugal action. This principle is made use of in the construction of the extractor here shown. It is found that if the extractor tubes are isolated in separate chambers, the possibility of turbulence carrying dust from the dead space outside of one extractor tube into an adjacent tube is entirely avoided. Consequently, it is preferred to construct inside of shell 11 a second shell containing honey comb partitions and comprising a central tube 29 surrounding the tube 15, and connected at its upper end to a top plate 31 which supports it.

This plate 31 is secured to the inside of the shell 11 at 32, and contains a plurality of spaced openings 33 through which the tubes 17 project. Depending from the lower end of tube 29 is a flared wall 34 through which the lower ends of the extractor tubes pass. The flared wall 34, together with annular portion 36 and bottom wall 37, forms a chamber 35 in which the extractor tubes terminate. The bottom 37 is perforated to receive the lower end of tube 15, and preferably contains a manhole 39 through which access may be had to the chamber 35 as desired. The chamber 35 is, therefore, in direct communication with the space above top plate 31 through tube 29, and thence to outlet 41.

The annular space between the outside of tube 29 and the inside of shell 11 is divided by honeycomb partitions 43 forming individual cells, each containing one of the extractor tubes. The partitions 43 connect tube 29 and shell 11, but terminate above the flared wall 34, as clearly shown in Fig. 1. These partitions not only prevent turbulence from carrying extracted dust from one extractor unit to another, but they guide the extracted dust downwardly into hopper 12, where it is discharged.

It will be clear from the foregoing, that the incoming dust-laden gas passes through inlet tube 19 around the skirt 23, where it is subjected to some centrifugal action and where the heavier dust particles are removed. These particles fall and pass into hopper 12 through the tube 15. After passing around the inside of the shell, the gas passes upwardly around the skirt 23 and into the inlet ends of tubes 17, thus dividing the main volume of gas into a plurality of small streams, each of which is subjected to centrifugal action in one of the extractor tubes. As these streams of gas pass downwardly, dust particles are thrown out centrifugally through openings 28 and fall into hopper 12, while the gas containing the very fine dust and fumes is discharged into chamber 35 and passes upwardly through tube 29 to outlet 41. The pressure of the gas entering or drawn through the inlet 19 is sufficient to maintain a flow of gas through the preliminary extractor in this manner.

After this preliminary separation of the dust is accomplished, the gas passes through outlet 41 into the saturater connected with this outlet. The saturater comprises a cylindrical shell 46 connected to the outlet 41 through an elbow 47, and having at the bottom a flared end 48 terminating in a liquid outlet 49. The shell 46 forms a saturation chamber 51 from which liquid may be drained by a valve 52. When this valve is closed, liquid is maintained at the level shown by a trap 53.

The shell 46 carries near its upper end, a perforated plate 54 separating the chamber 51 into two parts. These two parts are connected by tubes 55 passing through the perforations in plate 54. Extending through the shell 46 above the plate 54 is a hot water supply pipe 56 carrying several downwardly extending branches 57 terminating in nebulizing nozzles 58. These nozzles are preferably of ceramic material having bronze tips, and are so spaced with respect to the walls of the tubes 55 as to impart to the escaping water a maximum electrical charge, and to enhance to a high degree the formation of drops by condensation of the water vapor about the dust particles as nuclei. For maximum electrical effect, careful selection of materials, structural arrangement of spray nozzles, and water pressures, must be made. This structure is described and claimed in my copending application, Serial No. 589,253, filed January 27, 1932; hence, detailed description will not be necessary for an understanding of this invention.

It will be sufficient to state that as the gas stream passes through the tubes 55, it is saturated with water vapor and the vapor is so charged electrically as to cause electrical attraction between the fine water particles and the dust particles in the gas. Consequently, by properly designing the tubes 55 and the nozzles associated with them, and by proper control of the water temperature and pressure relative to the character and conditions of the gas being cleaned, any desired saturation ratio may be obtained. Thereafter, the exercise of proper condensing action will result in substantially freeing the gas from dust particles of all sizes, and rendering it suitable for many industrial uses at a cost much lower than that which prior forms of extracting systems have attained.

The preliminary extractor is capable of separating a high percentage of the large dust particles from the gas, but it is ineffective in removing the very fine dust particles or the fumes or metallic vapors which may be present, unless subsequent treatment causes supersaturation of the gas. The action of the saturation device is such as to thoroughly impregnate the gas with water in a vapor state, and to cause electrical attraction between the charged water particles and the dust particles which also become charged during their passage through the preliminary separator. The effectiveness of this saturation means is very largely dependent upon the further treatment of the gas to insure its contacting with cooling and condensing means to produce homogeneous condensation of the water vapor throughout the gas volume. Extensive experimentation has demonstrated the effectiveness of the condensing apparatus shown in Fig. 3.

Referring now to Fig. 3, the apparatus there shown comprises the preliminary extracting and saturation means just described, with the outlet from chamber 51 connected to the bottom of the condensing unit through a tube 59. As here shown, the condensing device embodies three units, but it is obvious that either a greater or less number of units may be employed to reduce the outflowing gas to any desired temperature or state of purity.

The units shown in Fig. 3 are each of substantially identical structure, consequently a description of one of them will be sufficient for a proper understanding of the invention. Each unit comprises a box 61 of substantially rectangular structure, having a top 68 and an inclined bottom 74. Each is completely closed except at the gas inlet 59 and gas outlet 62. The interior of the box is divided up into sections by alternating water boxes 63 and 67 of zigzag formation. These boxes project through the walls of box 61 but are open at the top and are each supplied with water at one end through a pipe 64 controlled by a valve 65 and connected to a water supply pipe 66. The boxes 63 and 67 extend beyond one side wall of the box 61, but terminate short of the other wall to leave a narrow passage between the separate gas chambers which they define.

The parts are so designed as to form a tortuous gas passageway between inlet 59 and outlet 62, and to cover all of the inside walls of this passage with a thin water film at all times. Depending from the top 68 of the box 61 are a plurality of zigzag flanges 69, cooperating with the boxes 63 and 67 and depending into these boxes so that there is no communication between the various gas passageways, except at the inner ends of boxes 63 and 67 adjacent the side walls of box 61. The outer wall of box 61 also carries near its top a narrow trough 71 extending entirely around it, and supporting the top 68. This trough is supplied with water by overflow from boxes 63 and 67 at their points of intersection. This water fills the trough and forms a water film over the entire inside wall of the box 61.

The top edges of the outer walls of the box 61 inside of trough 71 and of boxes 63 and 67 are preferably serrated to facilitate trickling of the water over the surfaces of the side walls and keeping them wetted at all points, even though the water level in the various boxes may vary.

All of the branch pipes 64 leading to boxes 63 and 67 are supplied with water from supply pipes 66 through a main water supply pipe 73. The trough 71 is likewise supplied with water by overflow from boxes 63 and 67, and the water from trough 71 and the boxes 63 and 67 trickles over the inside walls of box 61 and the outside walls of boxes 63 and 67, and then runs into the water collected at the bottom of the box. This bottom 74 is inclined and connected with an outflow pipe 75 containing a separating wall 76 in outflow chamber 78. Each of these outflow chambers is connected with the space above trough 71 by an equalizing pipe 72.

The wall 76 extends above the bottoms of boxes 63 and 67 and insures that the depth of water in the tortuous passageways is maintained constant to form a seal and prevent the gas from escaping through the water outlet. The pipes 66 of one unit are connected through pipes 77 with the units below them, and the units are in series so that each unit receives its water from the overflow of the unit directly above it. The depth of the water in each box may be individually controlled by manipulation of one of the valves 65, and the water from the last outflow chamber 78 can be drained away through a pipe 79. The gas outlet from each unit is connected with the gas inlet of the next unit above by a pipe section 81, these sections being in alternating relation with respect to the various units.

From an inspection of Fig. 3, it will be clear that the gas saturated with water vapor having the proper dew-point or saturation ratio, enters the inlet 59, passes along and in contact with the walls of boxes 63, 67 and 61, as shown by the arrows, where it is continually agitated and mixed up to bring substantially all of the gas molecules into contact with water film, thus lowering the temperature of the gas and causing condensation of the water vapor on the dust nuclei. The water droplets as they condense, fall into the water in the bottoms of boxes 61 and are carried away through the main outlet 79. The gas, as it passes from the inlet to the outlet of each box, continues to lose dust and water vapor by this effect until it reaches the outlet 62 of the top unit, where it is supplied to any desired source of storage or use. By proper choice of saturation ratio for the gas being treated, and regulation of the water films, the outgoing gas can be freed from dust particles and cooled to a temperature where it is free from water vapor.

In some instances where the available space is limited, it may be found desirable to combine the preliminary extractor unit, the saturation unit, and the condensing unit, in a single casing. Such a construction is shown in Fig. 6 of the drawings, wherein the reference character 82 designates a shell having at the bottom a hopper 83 controlled by a suitable valve 84. The shell 82 is closed by a conical top 99 carrying a central depending tube 88. Inside of the shell 82 and in spaced relation to it is a wall 86 supported by tube 88. Mounted in the horizontal portion 85 of wall 86 and depending around tube 88, are a plurality of extractor tubes of the type shown in Fig. 1, these tubes being in spaced relation and supported at the bottom by a flared bottom wall 87 connected to the central tube 88. The wall 87 has a vertical portion 90 and a bottom 93. Parts 87, 90 and 93, form a continuation of chamber 95 inside of tube 88. Above the wall 85 is an inlet chamber 89 to which gas is supplied through a tangential inlet 91 and passes around a skirt 92 in a manner similar to that described in connection with Fig. 1, this skirt 92 depending from top 99 below the tops of the dust extractor tubes in spaced relation to wall 82.

The wall 86 extends entirely around and encloses the extractor tubes and forms with the tube 88 a substantially annular chamber 80, divided by radial partitions 126 into a plurality of isolated cells each of which is in communication with the inside of hopper 83. The bottom ends of the extractor tubes pass through wall 87 and terminate in the bottom of chamber 95, where bottom 93 forms a liquid-receiving chamber having a drain pipe 94. With the structure so far described, the gas enters the inlet 91, passes around the skirt 92 until it reaches chamber 89, and then is divided into a plurality of streams. These streams then pass through the centrifugal extractor tubes from which the dust is thrown outwardly and escapes into hopper 83 through cylindrical space 80 between wall 86 and tube 88. The gas partially freed from dust, passes into the saturation chamber 95 inside of tube 88, where it is saturated with water vapor issuing from a nozzle 96 connected with a pipe 97 extending through the top of the apparatus.

Having described the preliminary dust extracting apparatus and the saturating means, it will now be pointed out how the temperature of the outgoing gas is lowered so as to condense the water vapor and to carry the dust particles out of the gas.

Above the shell 82 is an annular extension 98, within which is housed the condensing means. The extension 98 is secured to the top 99 of shell 82. Top 99 forms a water-tight connection with the outside of tube 88 above the chamber 89. Secured to the outer wall of extension 98 near the top thereof, is a flanged ring 101 cooperating with the top of extension 98 to form a water-collecting trough 125 and having a portion 102 which extends above and cooperates with a disc 103 and a flanged cover 104, to form the top of the apparatus.

The disc 103 closes the top of the condenser and contains a central opening 105 closed by a cover 123, through which the pipe 97 extends. The top 104 also contains a manhole 107 through which access may be had to the interior of the condenser through a cover 124.

Inside of the extension 98 and secured on the inner surface thereof in spaced relation to the bottom 99, are a series of troughs 108 in alternating relation with similar troughs 109 connected to the wall of tube 88. A central annular trough 111 is formed between the inner wall of tube 88 below its top and a flanged tube 112 which is secured to it. The troughs 108 are connected with annular trough 125 and the troughs 109 are connected with trough 111. Troughs 108 and 125 are supplied with water from pipe 115 controlled by valve 116. Troughs 109 and 111 are supplied with water through pipe 113 controlled by valve 114.

It will be noted that the top wall of tube 88 does not reach to the disc 103, but is in spaced relation thereto so that water in trough 111 can overflow and cover the outer surface of the tube 88 between troughs 109 with a water film. Likewise, the water in troughs 109 overflows their outer surfaces to form a water film, and the water all collects on the floor 99 of the condenser chamber and flows out through a pipe 117 containing a trap 118 for maintaining a predetermined level of water in the chamber. The wall of tube 88 contains a gas outlet 119 below the trough 111 and this supplies gas to the tortuous passageway between the troughs 108 and 109.

Depending from disc 103 into the water boxes 109 and 108 are a plurality of spaced radial baffles 127 and 128. The baffles 127 each extend from the wall of tube 88 to the end of a water box 109 and dip into the water in the box. Similarly, baffles 128 each extend from extension 98 to the end of the boxes 108. These baffles prevent direct passage of the gas over these water boxes and confine the gas to the tortuous passageway between them.

Gas can flow in one direction only, as shown in Fig. 7, because of the presence of an upstanding wall 121 connecting the floor 99 with the disc 103 at one side of the gas outlet passage 119. The other side of wall 121 is in communication with an outflow tube 122 which extends out through extension 98.

When the troughs 108, 109, 111 and 125 are filled with water so as to form a water film on all of the walls of the tortuous gas passage, and hot water is supplied to the chamber 95 through nozzle 96, gas containing fine dust and fume emerges from the ends of the extractor tubes in the lower end of chamber 95, and passes upwardly in counter-current to the water spray issuing from nozzle 96. The water is broken up into a fine nebulized spray, and the particles are electrically charged. The dust particles themselves, as well as the water particles, are electrically charged. If it be assumed that the dust is non-metallic, the positively charged dust particles will give up their charges to the negatively charged gas, hence all of the dust particles will assume a negative charge and will, therefore, be attracted by the water particles which are always positively charged.

The excess water falls and escapes through outflow pipe 94, while the gas charged with water vapor passes through gas outlet 119 into the tortuous passageway, where it is agitated and brought into contact with a large surface of water film, thereby lowering its temperature and causing condensation of the water vapor. The water containing the dust particles escapes through the outflow pipe 117, and the clean gas then escapes through the outlet 122 to its place of use.

It is to be understood that the tops of troughs 108 and 109 may be serrated as in the other forms of the apparatus, to facilitate the formation of water films on the outer surfaces of these troughs.

Although the apparatus of Fig. 6 is shown with only one condenser unit, it will be understood that a plurality of these condenser units may be superposed, as in the apparatus of Fig. 3, to augment the condensing effect by any amount desired.

The walls of water boxes 108 and 109 are shown as being smooth but it is within the scope of my invention to corrugate these walls, as shown in Fig. 9. The structure of Fig. 9 is similar to that of Figs. 6, 7 and 8, except that the walls of water boxes 108 and 109 are provided with vertical corrugations 129. These corrugations greatly increase the water film area and augment the cooling and condensing effect on the gas as well as aiding in its agitation.

Although I have herein shown and described only two forms of dust extracting apparatus embodying this invention, it will be obvious that various changes may be made in the details, within the scope of the claims, without departing from the spirit and scope of the invention.

What is claimed is:

1. The combination with a source of dusty gas containing electrically charged particles of water vapor, of a cooling and condensing unit comprising a closed chamber having a gas inlet and outlet; a plurality of open top boxes mounted in said chamber and defining a tortuous gas passage therein; means for supplying cooling water to said boxes in volume sufficient to cause overflow and to cover their outer surfaces with a continuous unbroken water film; and outlet means for carrying away the overflowing and condensed water together with dust collected by condensation of the water particles about the dust particles as nuclei.

2. The combination with a source of dusty gas containing electrically charged particles of water vapor, of a cooling and condensing unit comprising a closed chamber having a gas inlet and a gas outlet; means for covering the inner surfaces of the walls of said chamber with a film of cooling water; a plurality of transverse partitions of zigzag formation in said chamber, and defining a tortuous gas passage through said chamber; means for covering the surfaces of said partitions with water film; and means for carrying away the overflow and condensed water including dust particles carried down by the condensing process occurring in said chamber.

3. The combination with a source of dusty gas containing electrically charged particles of water vapor, of a cooling and condensing unit comprising a closed chamber having a gas inlet and a gas outlet; means for covering the inner surfaces of the walls of said chamber with a film of cooling water; a plurality of open water boxes of zigzag formation disposed transversely in said chamber and defining a tortuous gas passage through said chamber; means for supplying water to said boxes to form a water film on the outer walls of said boxes; a plurality of zigzag baffle plates depending from the top of said chamber into said boxes; a water outlet; and means for restricting the outflow of water from said chamber to prevent escape of gas through the water outlet.

4. A dust extractor comprising a closed shell having a gas inlet; a plurality of centrifugal dust extractor tubes disposed in the lower portion of said shell; a tubular member in said shell and connected with the discharge ends of said extractor tubes; a condenser chamber above said tubes in said shell and connected with said tubular member; a plurality of water boxes radially disposed in said chamber and defining a tortuous gas passage; means for supplying a film of water to the outer surfaces of said boxes; and means for carrying away the overflowing water.

5. In a dust extractor, means for saturating dusty gas with electrically charged particles of water vapor; means for condensing the water about the dust particles as nuclei, said means including a chamber containing a plurality of open top water boxes having corrugated walls; and means for continuously supplying the outer corrugated walls of said boxes with a water film at a temperature below that of the gas to be treated.

6. In a dust extractor, a chamber to which dusty gas is supplied under pressure; means for saturating the gas with electrically charged particles of water vapor at a temperature above the dew-point of the water, to render the dust particles in the gas wettable regardless of the sign of their electrical charge; and means for condensing said water vapor about the dust particles as nuclei, said condensing means comprising an irregular closed passage having its vertical walls covered with a continuous water film at a temperature below that of the gas to be treated.

7. A dust extracting system comprising a saturation chamber into which gas containing dust particles is introduced under pressure; means for saturating the gas within the chamber with electrically charged particles of water at a temperature above the dew-point of the water; and means comprising a tortuous passage having its walls covered by a continuous non-rupturable water film and in communication with the outlet from the saturation chamber for subjecting the saturated gas to a turbulent action and reducing its temperature below the dew-point of the water particles.

8. The combination with a source of dusty gas saturated with electrically charged particles of water vapor at a temperature above the dew-point of the water, of a condenser comprising a plurality of series-related units, each formed to define an irregular passageway; means for covering the walls of said passageways with a continuous water film to cause super-saturation of the gas under treatment; and means for carrying away the water from said units together with the dust particles deposited therein by condensation.

9. The combination with a source of dusty gas under pressure, of means for saturating the gas with electrically charged particles of water vapor at a temperature above the dew-point of the water; means remotely related to and in communication with said first means for producing super-saturation of the gas to cause condensation of the moisture therein about the dust particles as nuclei, said last mentioned means comprising a continuous supported water wall of irregular contour and arranged to cause frequent changes in the direction of gas flow to bring the entire free surface of the gas into contact with the water; and means for carrying away the water together with the dust deposited therein by condensation.

10. A dust extracting system comprising a source of dusty gas under pressure; a dry dust extracting unit; a saturating unit connected to the dry extracting unit for saturating the gas with electrically charged water vapor at a temperature above the dew-point of the water and rendering the dust particles in the gas wettable regardless of the sign of their electrical charge; and a condensing and agitating unit for lowering the temperature of the gas and causing super-saturation of the gas and condensation of water particles about the dust particles as nuclei, all of said units being mounted in a single housing.

11. In a dust extractor, means for saturating dusty gas with electrically charged particles of water vapor at a temperature above the dew-point of the water, to render the dust particles in the gas wettable regardless of the sign of their electrical charge; and means for condensing the water about the dust particles as nuclei, said condensing means comprising a series of tortuous passageways and means for supplying their walls with a continuous and non-rupturable film of water at a temperature below that of the gas to be treated.

FREDERICK H. WAGNER.